(12) United States Patent
Xiong et al.

(10) Patent No.: US 12,520,780 B1
(45) Date of Patent: Jan. 13, 2026

(54) WATERING SYSTEM, PLANTING SYSTEM, AND IRRIGATION SYSTEM

(71) Applicant: Vego Innovations, Inc., Tomball, TX (US)

(72) Inventors: Guangyuan Xiong, Tomball, TX (US); Chunyu Luo, Tomball, TX (US); Qunyan Jiang, Tomball, TX (US); Xubin Fan, Tomball, TX (US)

( * ) Notice: Subject to any disclaimer, the term of this patent is extended or adjusted under 35 U.S.C. 154(b) by 0 days.

(21) Appl. No.: 18/983,409

(22) Filed: Dec. 17, 2024

(30) Foreign Application Priority Data

Sep. 6, 2024 (CN) .......................... 202422196922.6

(51) Int. Cl.
*A01G 27/00* (2006.01)
*A01G 9/28* (2018.01)

(52) U.S. Cl.
CPC ............. *A01G 27/008* (2013.01); *A01G 9/28* (2018.02); *A01G 27/003* (2013.01)

(58) Field of Classification Search
CPC ....... A01G 27/003; A01G 27/008; A01G 9/28
See application file for complete search history.

(56) References Cited

U.S. PATENT DOCUMENTS

| | | | | |
|---|---|---|---|---|
| 3,387,786 A * | 6/1968 | Rynberk | ................... | B05B 1/20 47/33 |
| 3,485,449 A * | 12/1969 | Wilson | ................... | A01G 25/00 47/33 |
| 4,779,800 A * | 10/1988 | Tuomi | ................... | B05B 1/207 239/276 |
| 4,945,675 A * | 8/1990 | Kendrick | ............ | F21V 21/0824 47/33 |
| 5,535,545 A * | 7/1996 | Matz | ................... | F21V 21/0824 47/33 |
| 5,768,824 A * | 6/1998 | Matz | ........................ | A01G 9/28 47/33 |
| 5,956,892 A * | 9/1999 | Kownacki | ................ | A01G 9/28 47/33 |
| 6,138,405 A * | 10/2000 | Matz | ................... | F21V 21/0824 47/33 |
| 6,341,445 B1 * | 1/2002 | Morrison | ................. | A01G 9/28 47/33 |
| 6,619,565 B1 * | 9/2003 | Abbott | ................... | A01G 25/02 47/33 |

(Continued)

FOREIGN PATENT DOCUMENTS

| | | | | |
|---|---|---|---|---|
| CN | 109548534 A | * | 4/2019 | ............. A01G 27/00 |
| CN | 115349375 A | * | 11/2022 | ........... A01G 9/0297 |

(Continued)

*Primary Examiner* — Joshua J Michener
*Assistant Examiner* — Aaron M Rodziwicz

(57) ABSTRACT

A watering system, a planting system, and an irrigation system are disclosed. A watering system for a planting device with a frame includes a watering pipeline and a plurality of spraying members. The watering pipeline is mounted on the frame. The plurality of spraying members are located on the watering pipeline, and the plurality of spraying members are spaced apart on the frame. Water outlets of the plurality of spraying members face towards an interior of the frame, and the water outlets of the plurality of spraying members are capable of adjusting a water discharge direction relative to the frame to guide the water toward the interior of the frame for spraying.

18 Claims, 5 Drawing Sheets

(56) References Cited

U.S. PATENT DOCUMENTS

| | | | | |
|---|---|---|---|---|
| 2005/0035597 A1* | 2/2005 | Bamberger | ......... | F16L 37/0927 |
| | | | | 285/342 |
| 2016/0374277 A1* | 12/2016 | Lortscher | ............... | A01G 13/31 |
| | | | | 47/48.5 |
| 2017/0238475 A1* | 8/2017 | Van Pelt | ................. | A01G 9/28 |
| 2018/0368340 A1* | 12/2018 | Lelo | ......................... | A01G 9/02 |
| 2023/0111009 A1* | 4/2023 | Xiong | .................... | A01G 9/249 |
| | | | | 47/21.1 |

FOREIGN PATENT DOCUMENTS

| | | | | | |
|---|---|---|---|---|---|
| CN | 115486292 | A | * 12/2022 | ........... | A01G 27/003 |
| CN | 115589859 | A | * 1/2023 | .............. | A01G 2/10 |
| CN | 119452968 | A | * 2/2025 | .......... | A01M 7/0042 |
| KR | 20210120500 | A | * 10/2021 | ............... | A01G 9/28 |
| WO | WO-9806252 | A2 | * 2/1998 | .............. | A01G 9/28 |
| WO | WO-2014165919 | A1 | * 10/2014 | ............ | A01G 25/02 |

\* cited by examiner

WATERING SYSTEM, PLANTING SYSTEM, AND IRRIGATION SYSTEM

CROSS-REFERENCE TO RELATED APPLICATIONS

The present disclosure claims priority of the Chinese Patent application No. 202422196922.6 entitled "WATERING SYSTEM, PLANTING SYSTEM, AND IRRIGATION SYSTEM" filed on Sep. 6, 2024 in the China National Intellectual Property Administration, the entire contents of which are incorporated herein by reference.

FIELD OF THE DISCLOSURE

The present disclosure relates to the technical field of irrigation, in particular to a watering system, a planting system, and an irrigation system.

DESCRIPTION OF THE RELATED ART

In order to standardize planting sites and improve the aesthetics of planting, more and more users will adopt garden beds for planting. Users can place soil in the garden bed and plant in the soil.

Currently, plants in the garden bed can be irrigated by spraying or drip irrigation. However, irrigation of plants in the garden bed is currently not standardized, and it is impossible to achieve comprehensive and precise irrigation.

SUMMARY OF THE DISCLOSURE

The purpose of the present disclosure is to provide a watering system, a planting system, and an irrigation system, which aims to solve the technical problem of not being able to achieve comprehensive and precise irrigation for planting devices.

According to a first aspect, the present disclosure provides a watering system for a planting device with a frame, the frame is configured to accommodate planting media, the watering system comprises:
  a watering pipeline, the watering pipeline being mounted on the frame; and
  a plurality of spraying members, wherein the plurality of spraying members are located on the watering pipeline, the plurality of spraying members are spaced apart on the frame, water outlets of the plurality of spraying members face towards an interior of the frame, and the water outlets of the plurality of spraying members are capable of adjusting a water discharge direction relative to the frame to guide the water toward the interior of the frame for spraying.

In one embodiment of the present disclosure, the watering pipeline is a closed-loop pipeline, and the watering pipeline is annularly arranged on the frame.

In one embodiment of the present disclosure, the watering pipeline comprises a plurality of adapters and a plurality of connecting pipes, the plurality of adapters is mounted at intervals on a frame, two adjacent adapters are connected by a connecting pipe, at least part of the plurality of adapters are correspondingly connected to the plurality of spraying members on a one-to-one basis;
  each adapter comprises a base pipe, two first connectors, and at least one second connector, two ends of the base pipe are respectively provided with a first connector, and two first connectors are respectively connected to the connecting pipes located at two ends of the adapter, the second connector is connected to the base pipe, the second connector is located between the two first connectors and extends in a first direction, the second connector of at least part of the plurality of adapters is connected to the spraying member,
  wherein the first direction forms an angle with an extension direction of the base pipe.

In one embodiment of the present disclosure, the base pipe of each adapter extends along a circumferential direction of the frame, the base pipes of the plurality of adapters and the plurality of connecting pipes are annularly arranged on the frame.

In one embodiment of the present disclosure, the two first connectors are rotatably connected to the connecting pipes at two ends of the base pipe; and/or,
  the second connector is rotatably connected to the spraying member.

In one embodiment of the present disclosure, two ends of the connecting pipes are provided with a first clamping member, and the first clamping member is rotatably embedded in the first connector.

In one embodiment of the present disclosure, one end of the spraying member is provided with a second clamping member, the second clamping member is rotatably embedded in the first connector.

In one embodiment of the present disclosure, the watering system further comprises a plurality of fixing members, the plurality of fixing members are configured to fix to the frame, the plurality of fixing members correspond one-to-one with the plurality of adapters, the fixing member is provided with a rotating portion, the rotating portion is provided with a rotating hole, the base pipe is rotatably passed into the corresponding rotating hole along an extension direction of the base pipe.

In one embodiment of the present disclosure, the base pipe is provided with an annular rotating groove, and the annular rotating groove is rotatably passed through the corresponding rotating hole;
  the rotating portion comprises two spaced apart elastically clamping arms, the two elastically clamping arms enclose to form the rotating hole, and the two elastically clamping arms are clamped on the annular rotating groove.

In one embodiment of the present disclosure, a groove wall of the annular rotating groove is provided with a plurality of limiting protrusions spaced apart, an inner wall of the rotating hole is provided with a plurality of limiting teeth, at least part of the plurality of limiting protrusions is snapped into at least part of the plurality of limiting teeth.

In one embodiment of the present disclosure, each adapter is provided with two annular rotating grooves, and each fixing member is provided with two rotating portions, the two rotating portions correspond to the two annular rotating grooves respectively.

In one embodiment of the present disclosure, a side of the fixing member away from the adapter is provided with an arc-shaped groove, and the arc-shaped groove is configured to fit the frame.

In one embodiment of the present disclosure, the spraying member comprises a spraying pipe and a spraying control valve, the spraying control valve is arranged on the spraying pipe.

In one embodiment of the present disclosure, the spraying pipe comprises a malleable spraying pipe.

In one embodiment of the present disclosure, the watering pipeline is a non-closed pipeline.

In one embodiment of the present disclosure, the second connector is detachably connected to the base pipe.

In one embodiment of the present disclosure, the watering system further comprises at least one ground insertion spraying structure, the ground insertion spraying structure comprises a ground insertion spraying nozzle and a ground insertion pipeline, the ground insertion spraying nozzle is connected to the watering pipeline through the ground insertion pipeline.

According to a second aspect, the present disclosure provides a planting system. The planting system comprises:
- a garden bed and a watering system, the watering pipeline being arranged around an inner wall of the garden bed; a frame of the garden bed being configured to accommodate planting media; the watering system comprising:
- a watering pipeline, the watering pipeline being mounted on the frame; and
- a plurality of spraying members, wherein the plurality of spraying members are located on the watering pipeline, the plurality of spraying members are spaced apart on the frame, water outlets of the plurality of spraying members face towards an interior of the frame, and the water outlets of the plurality of spraying members are capable of adjusting a water discharge direction relative to the frame to guide the water toward the interior of the frame for spraying.

According to a first aspect, the present disclosure provides an irrigation system. The irrigation system comprises:
- a main pipeline;
- a plurality of branch pipelines; and
- a plurality of watering systems, wherein the plurality of watering systems correspond one-to-one with the plurality of branch pipelines, and each watering pipeline is connected to the main pipeline through the branch pipeline;
- wherein the watering system is configured for a planting device with a frame, the frame is configured to accommodate planting media, the watering system comprises:
- a watering pipeline, the watering pipeline being mounted on the frame; and
- a plurality of spraying members, wherein the plurality of spraying members are located on the watering pipeline, the plurality of spraying members are spaced apart on the frame, water outlets of the plurality of spraying members face towards an interior of the frame, and the water outlets of the plurality of spraying members are capable of adjusting a water discharge direction relative to the frame to guide the water toward the interior of the frame for spraying.

In one embodiment of the present disclosure, the irrigation system further comprises a plurality of watering control valves, the plurality of watering control valves correspond one-to-one with the plurality of branch pipelines, each watering control valve is arranged on the corresponding branch pipeline.

In the watering system, the planting system, and the irrigation system of the present disclosure, the watering pipeline can provide water to the plurality of spraying members. When it is necessary to spray water on plants in the frame, the water outlets of the plurality of spraying members can spray water towards the interior of the frame, thus irrigating plants in the frame. Since water outlets of the plurality of spraying members are capable of adjusting a water discharge direction relative to the frame, specific regions can be sprayed according to irrigation needs, achieving precise irrigation. Moreover, the plurality of spraying members are spaced apart on the frame, which ensures uniform and comprehensive irrigation of the plants in the frame to achieve comprehensive irrigation. In addition, since the watering pipeline and the plurality of spraying members are arranged at the frame, the installation of the watering system may be standardized to improve the aesthetics of the plants planted in the planting device.

BRIEF DESCRIPTION OF THE DRAWINGS

In order to more clearly illustrate the technical solutions of the embodiments of the present disclosure, the following will briefly introduce the accompanying drawings that need to be used in the description of the embodiments. It is obvious that the accompanying drawings in the following description are some of the embodiments of the present disclosure, and for those having ordinary skill in the art, without the exertion of creative labor, other accompanying drawings can be obtained based on these drawings.

Figure 1:
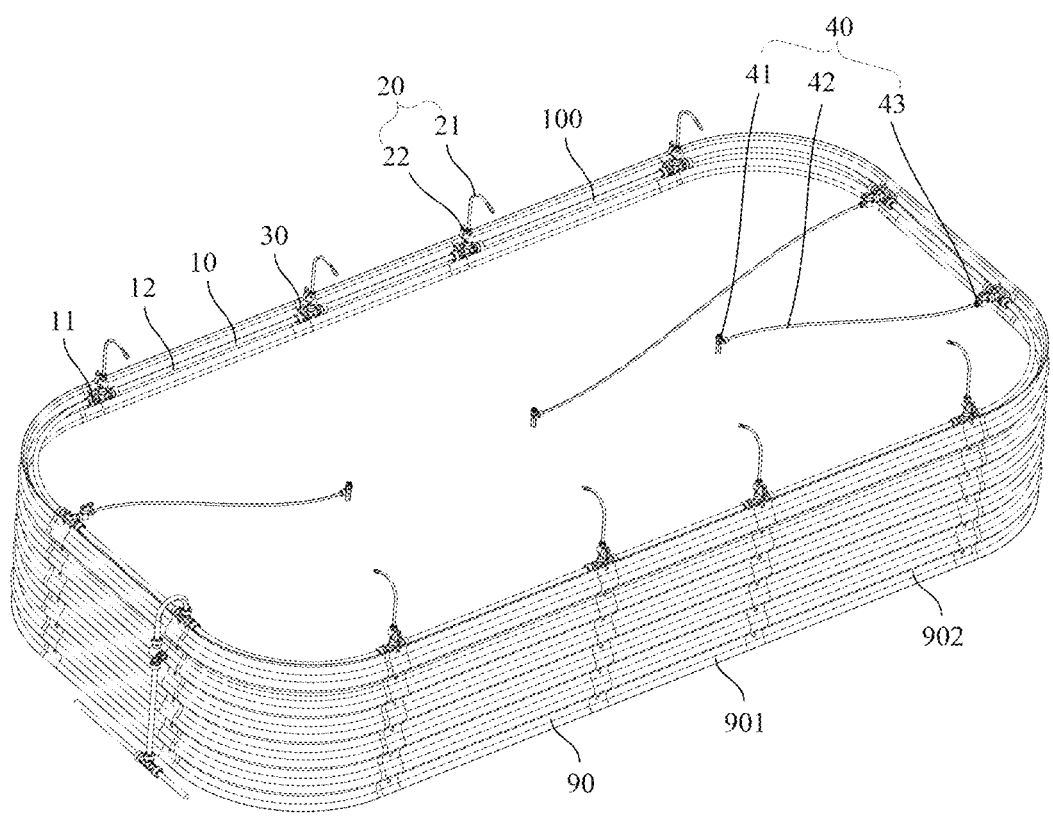
FIG. 1 is a schematic structural diagram of a watering system according to one embodiment of the present disclosure.

REFERENCE NUMERALS a, first direction;
100, watering system;
10, watering pipeline;
11, adapter; 110, base pipe; 11a, annular rotating groove; 111, first connector; 1111, inner cylinder; 1112, press-fit cylinder; 1113, press-fit protrusion;
112, second connector; 113, limiting protrusion; 114, seal ring;
12, connecting pipe; 121, first clamping member; 1211, clamping piece;
20, spraying member; 201, second clamping member; 21, spraying pipe; 22, spraying control valve;
30, fixing member; 31, rotating portion; 311, rotating hole; 3111, limiting tooth; 312, mounting catch; 32, connecting hole;
40, ground insertion spraying structure; 41, ground insertion spraying nozzle; 42, ground insertion pipeline; 43, ground insertion control valve;
90, planting device; 901, frame; 902, garden bed;
200, main pipeline;
300, branch pipeline, 301, watering control valve.

DETAILED DESCRIPTION

In the following, technical solutions in embodiments of the present disclosure will be described clearly and completely in conjunction with the accompanying drawings in embodiments of the present disclosure. It is obvious that the described embodiments are only a part of embodiments of the present disclosure and not all of the embodiments. Based on the embodiments in the present disclosure, other embodiments obtained by those having ordinary skill in the art without making creative labor are within the scope of protection of the present disclosure.

It should be noted that all directional indications (such as up, down, left, right, forward, back, etc.) in the embodiments of the present disclosure are only used to explain relative positional relationships, motion states, etc., among components in a certain specific posture. If the specific posture changes, the directional indications also change accordingly.

It should also be noted that when a component is said to be "fixed to" or "arranged on" another component, it may be directly on another component or there may be an intermediate component at the same time. When a component is said to be "connected" to another component, it may be directly connected to another component or indirectly connected to another component through an intermediate component.

Furthermore, terms "first", "second", etc. in the present disclosure are used for descriptive purposes only, and should not be understood as indicating or implying their relative importance or implicitly specifying the number of technical features indicated. Thus, features defined as "first", "second" etc., may explicitly or implicitly include one or more described features. In addition, technical solutions of the various embodiments may be combined with each other, but it should be based on the fact that those having ordinary skill in the art can implement them. When the combination of the technical solutions is contradictory or unattainable, it should be considered that such combination of technical solutions does not exist, and is not within the scope of protection claimed in the present disclosure.

The garden bed includes a planting region enclosed by a frame, and the user can place soil in the planting region and plant desired plants on the soil to standardize planting positions of the plants, resulting in improving aesthetics. Currently, irrigation of the planting region in the garden bed is carried out by methods of spraying or drip irrigation. For example, a spraying head is arranged at a high position to perform spraying or drip irrigation. The methods of spraying or drip irrigation are not standardized, making it difficult for drip irrigation or spraying to reach all positions of the garden bed, leading to omissions, and failing to achieve comprehensive and precise irrigation, and wasting water. In addition, existing irrigation methods will also affect aesthetics of the plants, for example, a spraying head at a high position needs to be configured with a bracket, and uneven irrigation will easily lead to the growth of plants in a messy manner, affecting aesthetics.

Therefore, embodiments of the present disclosure provide a watering system, a planting system, and an irrigation system, which can achieve comprehensive and precise irrigation for a planting device and make the watering system of the planting device standardized and aesthetically pleasing.

Some embodiments of the present disclosure are described in detail below in conjunction with the accompanying drawings. The following embodiments and features in the embodiments may be combined with each other without conflict.

Figure 2:
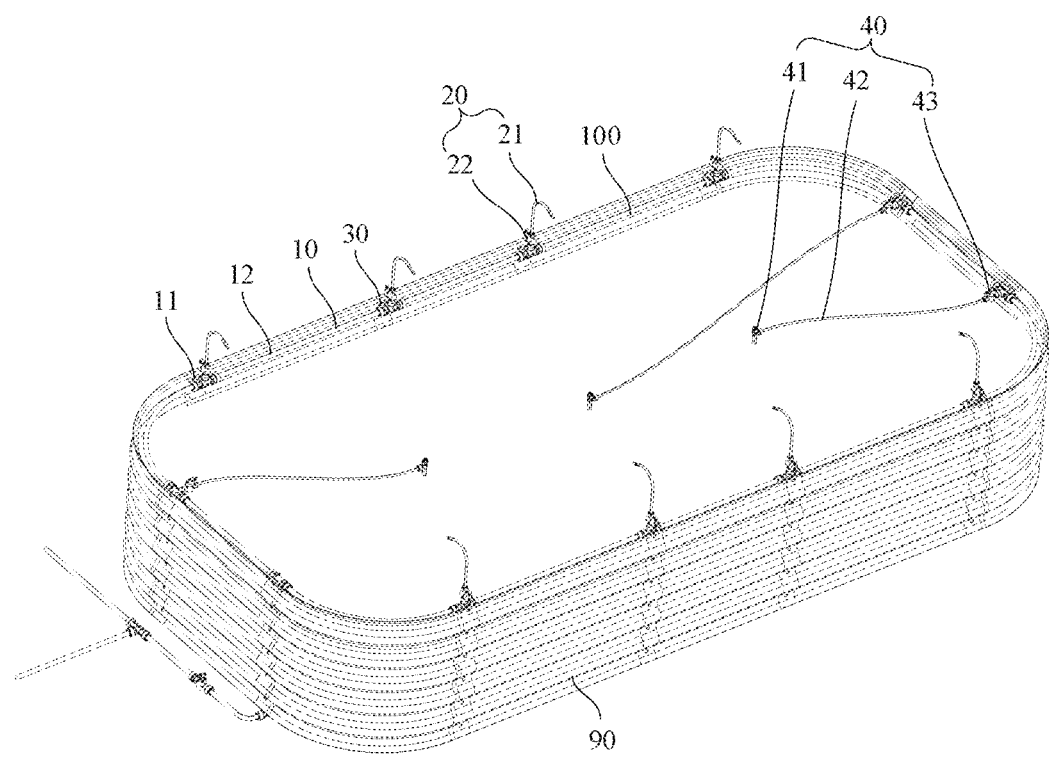
FIG. 2 is a schematic structural diagram of a watering system according to other embodiment of the present disclosure.

As shown in FIG. 1 and FIG. 2, embodiments of the present disclosure provide a watering system 100, the watering system 100 is configured for a planting device 90 with a frame 901. The watering system 100 includes a watering pipeline 10 and a plurality of spraying members 20.

The watering pipeline 10 is mounted on the frame 901. The plurality of spraying members 20 are located on the watering pipeline 10, the plurality of spraying members 20 are spaced apart on the frame 901. Water outlets of the plurality of spraying members 20 face towards an interior of the frame 901, and all water outlets of the plurality of spraying members 20 are capable of adjusting a water discharge direction relative to the frame 901 to guide the water toward the interior of the frame 901 for spraying.

In one embodiment, the watering pipeline 10 is mounted on a side wall of the frame 901. The plurality of spraying members 20 are spaced apart on the side wall of the frame 901, which ensures uniform and comprehensive irrigation of the plants in the frame 901 to achieve comprehensive irrigation. In addition, since the watering pipeline 10 and the plurality of spraying members 20 are arranged at the side wall of the frame 901, the installation of the watering system 100 may be standardized to improve the aesthetics of the plants planted in the planting device 90.

It should be noted that the planting device 90 is provided with a frame enclosed a region available for planting. The region may be configured to accommodate planting media and plants. For example, the planting medium may include soil or other planting medium that can be configured to grow plants such as vegetables, flowers, and herbs.

In one embodiment, the planting device 90 is a garden bed 902, a shape enclosed by the frame 901 is not limited and may be approximately rectangular or circular. Additionally, the material of the frame 901 of the garden bed 902 is not limited and may be a wooden frame or a metal frame. In other embodiments, the planting device 90 may also be a large flowerpot, a trellis, or other structure with a frame 901.

It should be noted that the watering pipeline 10 needs to be connected to an external water supply pipe. Water provided by the external water supply pipe may be delivered to the plurality of spraying members 20.

In the watering system 100 of the present disclosure, the watering pipeline 10 can provide water to the plurality of spraying members 20. When it is necessary to spray water on plants in the frame 901, the water outlets of the plurality of spraying members 20 can spray water towards the interior of the frame 901, thus irrigating plants in the frame 901. Since water outlets of the plurality of spraying members 20 are capable of adjusting a water discharge direction relative to the frame 901, specific regions can be sprayed according to irrigation needs, achieving precise irrigation. Moreover, the plurality of spraying members 20 are spaced apart on the frame 901, which ensures uniform and comprehensive irrigation of the plants in the frame 901 to achieve comprehensive irrigation. In addition, since the watering pipeline 10 and the plurality of spraying members 20 are arranged at the frame 901, the installation of the watering system 100 may be standardized to improve the aesthetics of the plants planted in the planting device 90.

As shown in FIG. 1 and FIG. 2, in one embodiment of the present disclosure, the watering pipeline 10 is a closed-loop pipeline, and the watering pipeline 10 is annularly arranged on the frame 901. It should be noted that the closed-loop pipeline means that after the watering pipeline 10 is supplied with water, the water in the entire watering pipeline 10 is uniform, which can ensure uniform water pressure at all parts of the watering pipeline 10, and ensure that each spraying member 20 sprays evenly when irrigating the plants inside the frame 901 through the plurality of spraying members 20, resulting in ensuring comprehensive and precise irrigation. Moreover, the watering pipeline 10 is not easily damaged or clogged, and can ensure a smooth flow of water. In addition, the watering pipeline 10 is annularly arranged on the frame 901, which is beneficial for the plurality of spraying members 20 to cover various positions of the frame 901, so as to achieve comprehensive and precise irrigation of the plants in the frame 901. Of course, in other embodiments, the watering pipeline 10 may also be a non-closed pipeline, for example, a long pipeline. In one embodiment, the watering pipeline 10 is annularly arranged on the side wall of the frame 901.

As shown in FIG. 1 and FIG. 2, in one embodiment of the present disclosure, the watering pipeline 10 includes a plurality of adapters 11 and a plurality of connecting pipes 12. The plurality of adapters 11 is mounted at intervals on a frame, two adjacent adapters 11 are connected by a connecting pipe 12. At least part of the plurality of adapters 11 are correspondingly connected to the plurality of spraying members 20 on a one-to-one basis. It should be understood that the adapter 11 includes a plurality of interconnected joints, and the plurality of connecting pipes 12 can be sequentially connected through the plurality of adapters 11 to form the above-described closed-loop pipeline. In the present disclosure, the adapter 11 is connected to the connecting pipe 12, and at least part of the adapters 11 are also connected to spraying members 20, so that when the water flowing through the adapter 11 can be sprayed through the connected spraying devices 20. Such a structure is convenient for installation, and the installation is standardized and reasonable, without affecting the plants in the planting device 90, making the planting device 90 more neat and convenient for planting, avoiding tangled knots or entangled plants between the pipes, and facilitating the flow of the water, and and also not causing obstacles to the passage of a user. In addition, the plurality of adapters 11, the plurality of connecting pipes 12, and the plurality of spraying members 20 are all detachable so that the connecting pipes 12 and the spraying members 20 can be replaced or upgraded. For example, a thicker connecting pipe 12 and a spraying member 20 with a larger water spraying volume can be replaced to meet the growth needs of different plants and improve economic benefits.

In one embodiment, the adapter 11 is a three-way member, for example, two joints of the adapter 11 are respectively connected to the connecting pipelines 12, and another joint of the adapter 11 is connected to the spraying member 20. Of course, in other embodiments, it can be a four-way member, a five-way member, and so on, e.g., two joints of the adapter 11 are connected to the connecting pipes 12, and other joints of the adapter 11 are connected to a plurality of spraying members 20. The present disclosure does not limit the number of joints of the adapter 11.

In one embodiment, one of the adapters 11 is connected to an external water supply pipe, thus eliminating the need for an additional water supply interface, making assembly of the watering system 100 simple and standardized.

As shown in FIG. 1 and FIG. 2, in one embodiment of the present disclosure, the plurality of adapters 11 are evenly spaced and mounted at the frame 901. In one embodiment, the plurality of adapters 11 are mounted at the side wall of the frame 901. It should be understood that after the plurality of adapters 11 are evenly arranged, lengths of the connecting pipes 12 between every two adjacent adapters 11 are also the same, so that structures of the plurality of adapters 11 are consistent and structures of the plurality of connecting pipes 12 are consistent, making the watering system 100 modular and standardized, so as to facilitate arrangement of the watering system 100, and also facilitate replacement or upgrade of the plurality of adapters 11 and the plurality of connecting pipes 12. In one embodiment of the present disclosure, a spacing of the plurality of adapters 11 may be determined according to a spraying range of the spraying member 20, and it is necessary to ensure that the spraying range of the spraying member 20 connected by adjacent adapters 11 can cover a region between them.

Figure 3:
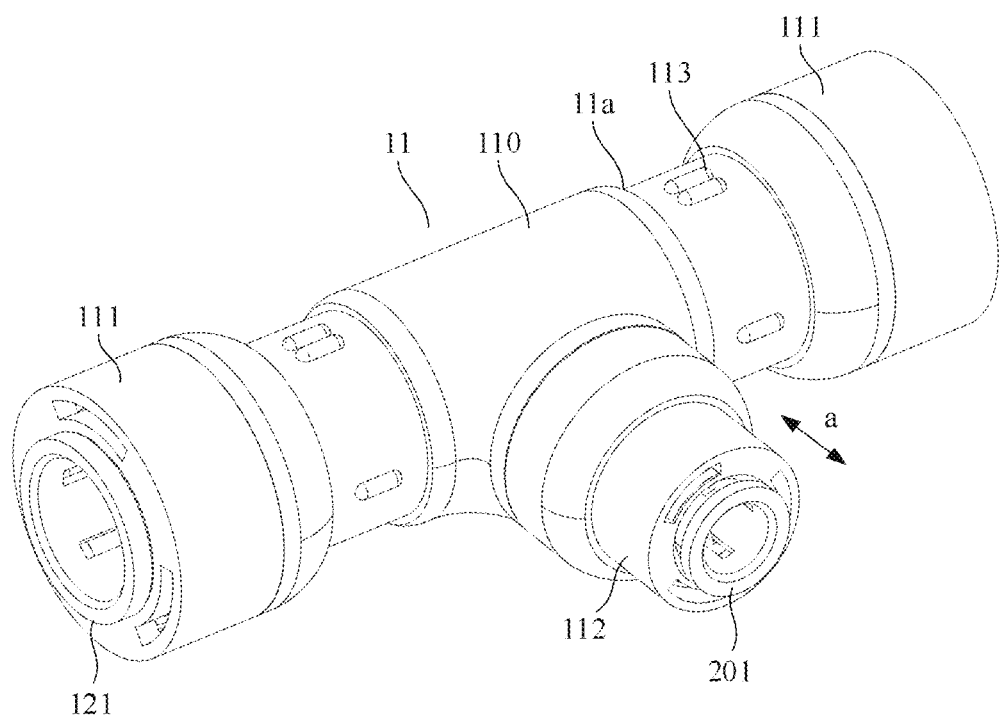
FIG. 3 is a schematic structural diagram of an adapter of a watering system according to one embodiment of the present disclosure.
Figure 4:
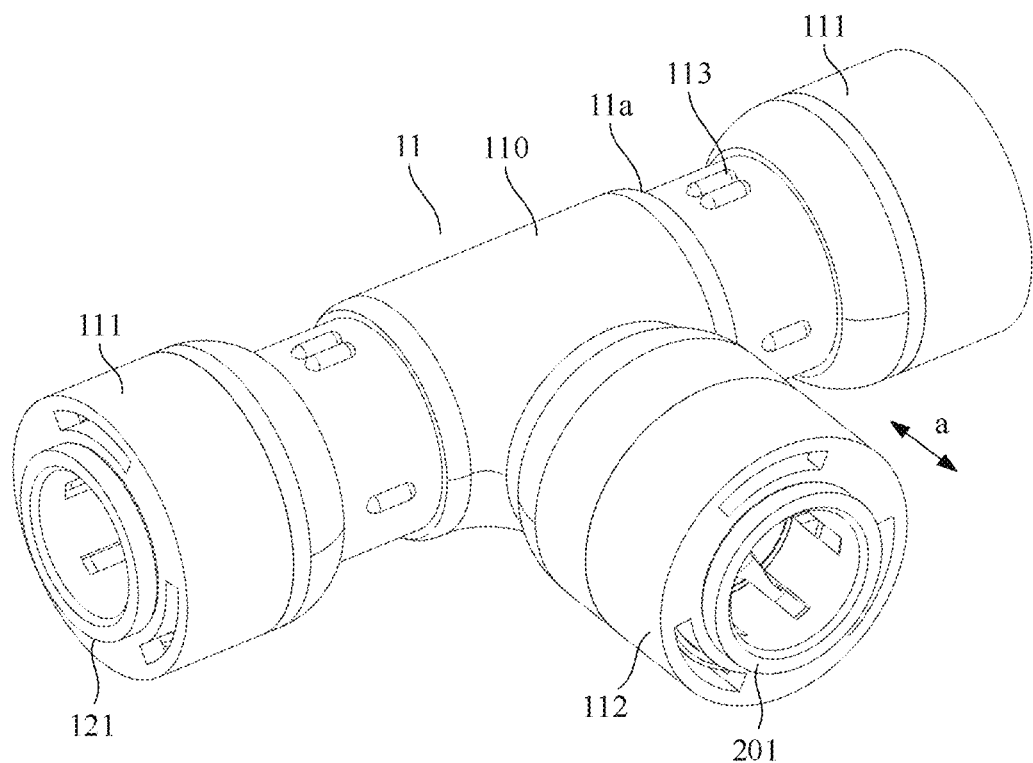
FIG. 4 is a schematic structural diagram of an adapter of a watering system according to other embodiment of the present disclosure.

As shown in FIG. 1, FIG. 3, and FIG. 4, in one embodiment of the present disclosure, each adapter 11 includes a base pipe 110, two first connectors 111, and at least one second connector 112. Two ends of the base pipe 110 are respectively provided with a first connector 111, and two first connectors 111 are respectively connected to the connecting pipes 12 located at two ends of the adapter 11. It should be noted that a channel of the base pipe 110 has no bends and passes through the two first connectors 111 along a length extension direction of the base pipe 110. When connecting the connecting pipes 12 through the two first connectors 111, the channel of the base pipe 110 and the connecting pipes 12 have the same extension direction, ensuring smooth water flow in the watering pipeline 10, reducing the likelihood of blockages and benefiting the irrigation of the watering system 100.

As shown in FIG. 1, FIG. 3, and FIG. 4, in one embodiment of the present disclosure, the second connector 112 is connected to the base pipe 110, the second connector 112 is located between the two first connectors 111 and extends in a first direction a. The second connector 112 of at least part of the plurality of adapters 11 is connected to the spraying member 20. The first direction a forms an angle with an extension direction of the base pipe 110. It should be understood that when the spraying members 20 are connected through the second connector 112, the spraying members 20 can spray water towards the interior of the frame 901, so as to facilitate irrigation. When the second connector 112 is used to connect an external water supply pipe, it is also convenient for connection and will not conflict with an installation position of the watering pipeline 10, so as to facilitate water supply.

As shown in FIG. 3 to FIG. 6, in one embodiment, the first direction a is perpendicular to an extension direction of the base pipe 110. so as to facilitate the spraying member 20 to spray water towards the interior of the frame 901 for irrigation. In one embodiment, the second connector 112 is located in the middle of the base pipe 110. It should be understood that the base pipe 110 is a symmetrical structure along an extension direction of the base pipe 110, and connecting the second connector 112 to the middle of the base pipe 110 may simplify installation and facilitate adjusting and determining the spacing of the plurality of spraying members 20.

In one embodiment of the present disclosure, the second connector 112 is detachably connected to the base pipe 110 so that the second connector 112 can be replaced as needed. For example, in FIG. 3 and FIG. 5, the second connector 112 is configured for connecting to the spraying member 20, a channel within the second connector 112 is thinner to provide the spraying member 20 with a higher water pressure, improving the spraying effect. For example, in FIG. 4 and FIG. 6, the second connector 112 is configured for connecting to an external water supply pipe, a channel within the second connector 112 is thicker to provide the watering system 100 with a large amount of water quickly, meeting irrigation needs.

In one embodiment, the base pipe 110 is provided with a threaded hole communicating with a channel of the base pipe 110, and one end of the second connector 112 is provided with a threaded connector. The second connector 112 may be threadedly connected to the base pipe 110 for installation between the second connector 112 and the adapter 11, so as to allow for replacement of different second connectors 112 as needed to meet usage requirements.

As shown in FIG. 1 and FIG. 3, as well as FIG. 4, in one embodiment of the present disclosure, the base pipe 110 of each adapter 11 extends along a circumferential direction of the frame 901. The base pipes 110 of the plurality of adapters 11 and the plurality of connecting pipes 12 are annularly arranged on the frame 901. Thus the watering pipeline 10 forms a closed loop ensuring that each spraying member 20 sprays evenly, so as to ensure comprehensive and precise irrigation and make the watering system 100 standardized and aesthetically pleasing. In one embodiment, the base pipes 110 of the plurality of adapters 11 and the plurality of connecting pipes 12 are annularly arranged on the side wall of the frame 901.

In one embodiment, the connecting pipe 12 extends along a circumferential direction of the frame 901, so as to ensure smooth flow of water.

As shown in FIG. 1, FIG. 3, and FIG. 4, in one embodiment of the present disclosure, the two first connectors 111 are rotatably connected to the connecting pipes 12 at two ends of the base pipe 110. It should be understood that each adapter 11 can rotate relative to the connecting pipes 12 connected at two ends of the adapter 11, so that when installing the watering pipeline 10, the position of the adapter 11 can be adjusted as needed, and thus the position of the second connectors 112 can be adjusted to adjust other structure connected to the adapters 11. For example, the position of the second connectors 112 can be adjusted to adjust the position of the spraying member 20 to adjust a water discharge direction of a water outlet of the spraying member 20, thus adjusting a spraying angle to improve the spraying effect and achieve comprehensive and precise irrigation. For example, precise irrigation can be carried out on roots of plants, which is beneficial to plant growth and at the same time reduces water resource waste caused by imprecise irrigation. For example, the position of the second connectors 112 can be adjusted to a position of the external water supply pipe so that water can be supplied smoothly through the external water supply pipe. Of course, in other embodiments, the two first connectors 111 may also be fixedly connected to the connecting pipe 12 to ensure the sealing of the watering pipeline 10.

As shown in FIG. 1, FIG. 3, and FIG. 4, in one embodiment of the present disclosure, two ends of the connecting pipes 12 are provided with a first clamping member 121, and the first clamping member 121 is rotatably embedded in the first connector 111. The first clamping member 121 can rotate relative to the adaptor 11, and then enable the adaptor 11 to rotate relative to the connecting pipes 12 connected at two ends of the adaptor 11 to adjust the position of the adaptor 11 as needed.

Figure 5:
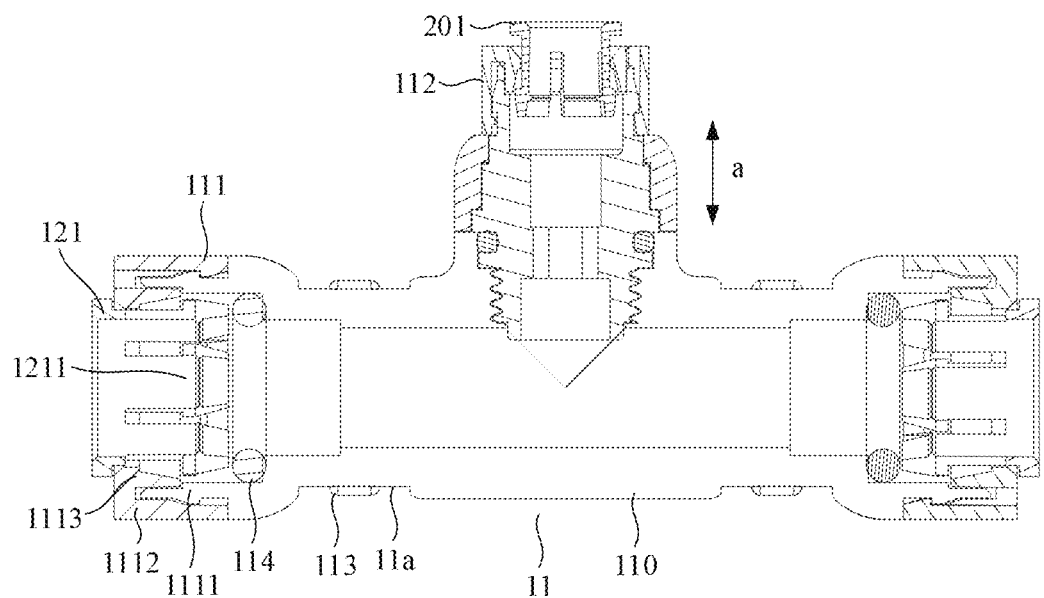
FIG. 5 is a cross-sectional view of an adapter of a watering system according to one embodiment of the present disclosure.
Figure 6:
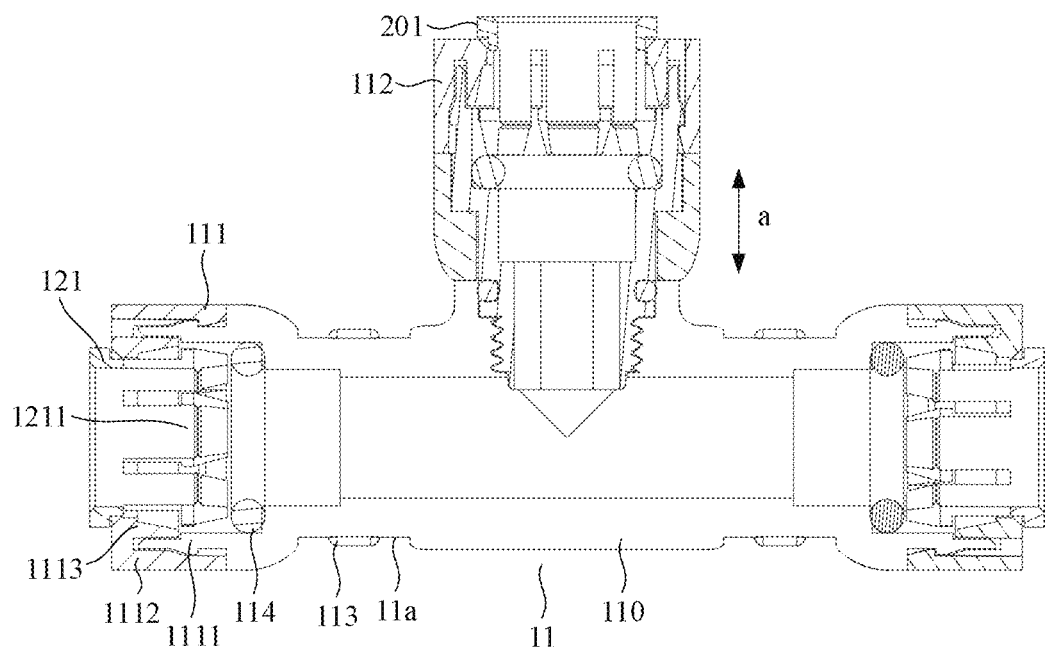
FIG. 6 is a cross-sectional view of an adapter of a watering system according to other embodiment of the present disclosure.

As shown in FIG. 5 and FIG. 6, in one embodiment, the first connector 111 includes an inner cylinder 1111 and a press-fit cylinder 1112. The press-fit cylinder 1112 is surrounded and fixed to an opening of the inner cylinder 1111. The press-fit cylinder 1112 is provided with a press-fit protrusion 1113 protruding from an inner wall of the inner cylinder 1111. The first clamping member 121 is provided with a plurality of clamping pieces 1211 spaced and arranged around a center. A side of the plurality of clamping pieces 1211 away from the center is provided with a press-fit groove, the plurality of clamping pieces 1211 extends into the inner cylinder 1111, the press-fit protrusion 1113 is placed in the press-fit groove to avoid the first clamping member 121 from detaching from the first connector 111, and to enable relative rotation between the first connector 111 and the first clamping member 121.

As shown in FIG. 5 and FIG. 6, in one embodiment, one end of the clamping piece 1211 away from the press-fit protrusion 1113 is provided with a wedge-shaped protrusion. Thus, when the first clamping member 121 is passed into the first connector 111, the clamping piece 1211 may be driven to bend and deform, until the press-fit protrusion 1113 is placed in the clamping groove and the clamping piece 1211 recovers. In this way, it is convenient for the docking installation of the adapter 11 and the connecting pipe 12.

As shown in FIG. 5 and FIG. 6, in one embodiment, the press-fit protrusion 1113 is provided with a wedge-shaped surface toward the first clamping member 121. When it is necessary to detach the first clamping member 121 from the first connector 111, the clamping piece 1211 will contact the wedge-shaped surface, thereby causing the clamping piece 1211 to bend and deform, until the first clamping member 121 is detached from the first connector 111 and the clamping piece 1211 recovers. The assembly and disassembly of the first connector 111 and the first clamping member 121 are simple and convenient, which facilitates the assembly of the watering system 100, and also facilitates the replacement or upgrade of the adapter 11 and the connecting pipe 12.

As shown in FIG. 5 and FIG. 6, in one embodiment, an outer wall of the inner cylinder 1111 is provided with an annular groove, and the press-fit cylinder 1112 is provided with an annular protrusion. The annular protrusion is embedded in the annular groove to achieve a stable installation of the inner cylinder 1111 and the press-fit cylinder 1112. When it is necessary to detach the adaptor 11 and the connecting pipe 12, the press-fit cylinder 1112 or the first clamping member 121 can be detached.

As shown in FIG. 5 and FIG. 6, in one embodiment, the inner cylinder 1111 is provided with a stepped groove, and a sealing ring 114 is arranged at the stepped groove to mate with the first clamping member 121, maintaining a sealed connection between the adapter 11 and the connecting pipe 12.

As shown in FIG. 1, FIG. 3, and FIG. 4, in one embodiment of the present disclosure, the second connector 112 is rotatably connected to the spraying member 20. Thus, the spraying member 20 can be rotated relative to the adapter 11 as needed to adjust a water out direction of a water outlet of the spraying member 20, thereby adjusting a spraying angle of the spraying member 20, improving the spraying effect, and achieving comprehensive and precise irrigation. In combination with the above, the adapter 11 can adjust the spraying angle of the spraying member 20 by rotating relative to the connecting pipe 12, further adjusting the water discharge direction of the water outlet, and thereby adjusting a spraying position of the spraying member 20 to further meet demands of precise irrigation. It should be noted that the two spraying angle adjustment directions have an angle so as to achieve full-range spraying angle changes to meet irrigation demands. In other embodiments, the second connector 112 may also be fixedly connected to the spraying member 20 to ensure a sealing connection between the spraying member 20 and the watering pipeline 10.

As shown in FIG. 1, FIG. 3, and FIG. 4, in one embodiment of the present disclosure, one end of the spraying member 20 is provided with a second clamping member 201, the second clamping member 201 is rotatably embedded in the first connector 111. The second clamping member 201 can be rotated relative to the adapter 11, thereby enabling the spraying member 20 to be rotated relative to the adapter 11 to adjust a spray angle as needed.

As shown in FIG. 5 and FIG. 6, in one embodiment, the structure and connection of the second connector 112 and the second clamping member 201 can refer to the structure and connection of the first connector 111 and the first clamping member 121 described above, and will not be repeated herein. The disassembly and assembly of the second connector 112 and the second clamping member 201 are easy, which facilitates the disassembly and assembly of the spraying member 20, and thus facilitates the replacement or upgrade of the spraying member 20.

Figure 7:
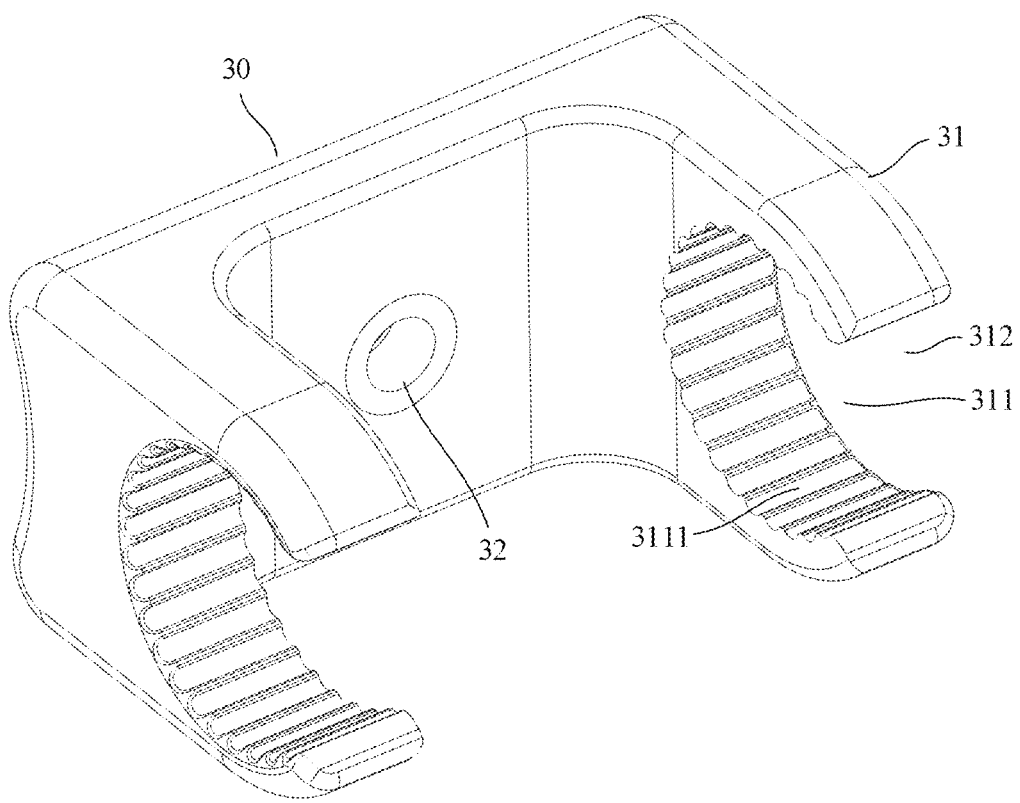
FIG. 7 is a schematic structural diagram of a fixing member of a watering system according to one embodiment of the present disclosure.

As shown in FIG. 1, FIG. 3, and FIG. 7, in the embodiment of the present disclosure, the watering system 100 further includes a plurality of fixing members 30, the plurality of fixing members 30 are configured to fix to the frame 901, the plurality of fixing members 30 correspond one-to-one with the plurality of adapters 11. The fixing member 30 is provided with a rotating portion 31, the rotating portion 31 is provided with a rotating hole 311, the base pipe can be rotatably passed into the corresponding rotating hole 311 along an extension direction of the base pipe. The plurality of fixing members 30 can fix the plurality of adapters 11 on the frame 901, the two adjacent adapters 11 can fix the connecting pipe 12 between the two adjacent adapters 11. Thus, the entire watering pipeline 10 can be fixed on the frame 901, which is simple and convenient to install, which is simple and convenient to install. In one embodiment, the adapter 11 can be rotated relative to the rotating portion 31 so as to achieve the rotation of the adapter 11 relative to the connecting pipes 12 located at two ends of the adapter 11, and thus the angle of the adapter 11 can be adjusted as needed. In other embodiments, the fixing member 30 may also be fixedly connected to the adapter 11.

In one embodiment, the frame 901 is provided with a fixing hole, the fixing member is provided with a connecting hole. A fastener is fitted through the fixing holes and connected to the connection holes 32 to achieve a secure installation of the fixing member 30. For example, the fastener may be a fastening screw. A plurality of fixing holes may be spaced and arranged on the frame 901, and the plurality of fixing members 30 may be fixed at some of the fixing holes, so that the position of the spraying member 20 may be adjusted as needed to meet the irrigation demand. In one embodiment, the plurality of fixing holes may be arranged on the side wall of the frame 901.

In one embodiment, the planting device 90 includes a garden bed, a frame of the garden bed includes a plurality of wavy-shaped boards connected in sequence. Adjacent wavy-shaped boards are locked to each other by fastening screws and fixing holes, so that the fixing member 30 can be assembled using the garden bed's own fastening screws and fixing holes, which is convenient to operate.

In other embodiments, the watering system 100 further includes a plurality of coupling members, the plurality of coupling members are press-fitted on the connecting pipe 12 and fixedly connected to the frame to stably install the connecting pipe 12.

As shown in FIG. 3 and FIG. 7, in one embodiment of the present disclosure, the adapter 11 is provided with an annular rotating groove 11a, and the annular rotating groove 11a is rotatably passed through the corresponding rotating hole 311. The annular rotating groove 11a is configured to limit a position of the rotating portion 31 preventing the rotating portion 31 from moving along an extension direction of the base pipe and detaching from the adapter 11, thereby ensuring the stable installation of the fixing member 30 and the adapter 11.

In one embodiment, the rotating portion 31 includes two spaced apart elastically clamping arms. The two elastically clamping arms enclose to form the rotating hole 311, and the two elastically clamping arms are clamped on the annular rotating groove 11a. It should be understood that a mounting catch 312 communicating with the rotating hole 311 is located between the two elastically clamping arms. The adapter 11 can enter the rotating hole 311 from the mounting catch 312 to connect with the fixing member 30. To prevent the adapter 11 from detaching from the rotating hole 311, ends of the two elastically clamping arms extend toward each other so that a width of the mounting catch 312 is smaller than a aperture diameter of the rotating hole 311. When the adapter 11 is installed, the two elastically clamping arms can be elastically deformed by an external force to make the mounting catch 312 expand. Then the adapter 11 can be passed into the rotating hole 311 from the mounting catch 312. The two elastic clamp arms recover to initial shapes to achieve the stable installation of the adapter 11. Such a structure is convenient for disassembly and assembly.

As shown in FIG. 1, FIG. 3, and FIG. 7, in one embodiment of the present disclosure, a groove wall of the annular rotating groove 11a is provided with a plurality of limiting protrusions 113 spaced apart. An inner wall of the rotating hole 311 is provided with a plurality of limiting teeth 3111. At least part of the plurality of limiting protrusions 113 is snapped into at least part of the plurality of limiting teeth 3111. At least part of the plurality of limiting protrusions 113 are engaged with at least part of the plurality of limiting teeth 3111 to ensure angular stabilization of the adapter 11 after the adapter 11 is rotated to a certain position relative to the fixing member 30. Moreover, under the action of external force, the adapter 11 can still be rotated relative to the fixing member 30, allowing different limiting protrusions 113 and limiting teeth 3111 to cooperate with each other, so that the adapter 11 remains stable after being adjusted to a certain angle. When the spraying member 20 is connected through the adapter 11, a spraying angle of the spraying member 20 can be adjusted through the adapter 11 and maintained stable to ensure stable irrigation.

In one embodiment, the plurality of limiting teeth 3111 are continuously arranged around a center of the rotating hole 311 to ensure that at least part of the plurality of limiting teeth 3111 can cooperate with the limiting protrusions 113 so as to maintain a angle of the adapter 11.

In one embodiment, a distance of adjacent limiting protrusions 113 is not greater than a circumferential distance of the mounting catch 312 along the annular rotating groove 11a. Thus, most of the limiting protrusions 113 can cooperate with the limiting teeth 3111 to ensure angle stability of the adapter 11. For example, six limiting protrusions 113 are arranged in the annular rotating groove 11a, the six limiting protrusions 113 include four groups of limiting protrusions 113, the four groups of limiting protrusions 113 are evenly spaced around the annular rotating groove 11a. Among two groups of limiting protrusions 113 on the opposite sides, each group includes two adjacent limiting protrusions 113.

Among other two groups of limiting protrusions 113 on the opposite sides, each group includes one limiting protrusion 113.

In one embodiment, the limiting protrusion 113 is adapted to the limiting tooth 3111 to further ensure stable cooperation between the limiting protrusion 113 and the limiting tooth 3111.

In one embodiment, the limiting protrusion 113 is an arc-shaped protrusion along a circumferential direction of the annular rotating groove 11*a*, and the limiting tooth 3111 is an arc-shaped groove along a circumferential direction of the rotating hole 311 so that the adapter 11 can be rotated relative to the rotating hole 311 by an external force.

As shown in FIG. 3 and FIG. 7, in one embodiment of the present disclosure, each adapter 11 is provided with two annular rotating grooves 11*a*, and each fixing member 30 is provided with two rotating portions 31. The two rotating portions 31 correspond to the two annular rotating grooves 11*a* respectively. Through the cooperation of the two rotating portions 31 and the two annular rotating grooves 11*a*, the adapter 11 can be further stably mounted on the fixing member 30.

In one embodiment, two annular rotating grooves 11*a* are respectively located on both sides of the second connector 112, so that the adapter 11 can be stably mounted on the fixing member 30.

As shown in FIG. 1 and FIG. 7, in one embodiment of the present disclosure, a side of the fixing member 30 away from the adapter 11 is provided with an arc-shaped groove, and the arc-shaped groove is configured to fit the frame, especially an inner wall of the frame of the garden bed frame. It should be noted that the inner wall of the garden bed is provided with an arc-shaped protrusion protruding towards an inner side of the garden bed, the arc-shaped protrusion can cooperate with the arc-shaped groove on a back side of the fixing member 30, ensuring that the fixing member 30 can be stably mounted on the inner wall of the garden bed. For example, the frame of the garden bed is a metal frame with an arc-shaped groove and an arc-shaped protrusion, ensuring that the garden bed is structurally stable and can also be adapted to the construction of the fixing member.

As shown in FIG. 1 and FIG. 2, in one embodiment of the present disclosure, the spraying member 20 includes a spraying pipe 21 and a spraying control valve 22, the spraying control valve 22 is arranged on the spraying pipe 21. The spraying control valve 22 is configured to control opening or closing of the spraying pipe 21, so that a certain spraying pipe 21 can be opened or closed according to specific irrigation demands, thereby achieving the precise irrigation demands. For example, if only plants in a certain region of the frame need to be irrigated, the corresponding spraying pipe 21 can be opened and other spraying pipes 21 can be closed for irrigation.

In one embodiment, one end of the spraying pipe 21 is connected to the spraying control valve 22, and the spray control valve 22 is connected to the adapter 11 through the second clamping member 201. The spraying pipe 21 and the spraying control valve 22 are a quick-release connection so that the spraying pipe 21 can be replaced or upgraded.

In one embodiment, other end of the spraying pipe 21 is provided with a spraying head, the spraying head is provided with a plurality of spraying holes. Water can enter the spraying pipe 21 and be sprayed out through the plurality of spraying holes to achieve the effect of spraying irrigation.

As shown in FIG. 1 and FIG. 2, in one embodiment of the present disclosure, the spraying pipe 21 includes a malleable spraying pipe 21. Thus, the spraying pipe 21 can be bent according to the position of the plant, so that a water outlet of the spraying pipe 21 can spray water towards a specific position, As shown in FIG. 1 and FIG. 2, in one embodiment of the present disclosure, the watering system 100 further includes at least one ground insertion spraying structure 40. The ground insertion spraying structure 40 includes a ground insertion spraying nozzle 41 and a ground insertion pipeline 42. The ground insertion spraying nozzle 41 is connected to the watering pipeline 10 through the ground insertion pipeline 42, and the ground insertion spraying nozzle 41 is positioned on planting soil. It should be noted that a bottom of the ground insertion spraying nozzle 41 is provided with an insertion rod, the insertion rod can be inserted into the planting soil. With the ground insertion spraying nozzle 41, additional coverage for irrigation can be achieved, further realizing comprehensive irrigation.

In one embodiment, the ground insertion pipeline 42 may be fixed by a coupling member on soil. The coupling member may be press-fitted the soil to fix the ground insertion pipeline 42.

In one embodiment, the ground insertion spraying structure 40 is a supplement to the spraying member 20. If the plurality of spraying members 20 can cover an irrigation region required by the planting device 90, there is no need to configure the ground insertion spraying structure 40.

As shown in FIG. 1 and FIG. 2, in one embodiment of the present disclosure, the ground insertion pipeline 42 is connected to the second connector 112 of the adapter 11, and the ground insertion pipeline 42 is rotatably connected to the second connector 112. A structure of the rotatable connection between the ground insertion pipeline 42 and the second connector 112 can refer to a structure of the rotatable connection between the second connector 112 and the spraying member 20, and will not be repeated here. Thus, water can be directly supplied to the ground insertion spraying nozzle 41 through the adapter 11 without the need for an additional water outlet structure on the watering pipeline 10, making the assembly of the watering system 100 simple and standardized. Moreover, it is also convenient to disassemble and assemble the ground insertion spraying structure 40, which is beneficial to the replacement or upgrade of the ground insertion spraying structure 40.

In one embodiment, the second connector 112 of the adapter 11 connected to the ground insertion pipeline 42 is arranged toward soil in the frame to reduce the bending of the ground insertion pipeline 42 and ensure that water flow can smoothly enter the ground insertion spraying nozzle 41.

In one embodiment, a plurality of spraying holes are arranged on a circumferential side of a top of the ground insertion spraying nozzle 41. Water can enter the ground insertion spraying nozzle 41 and be sprayed out through the plurality of spraying holes, achieving the effect of circumferential spraying irrigation.

As shown in FIG. 1 and FIG. 2, in one embodiment of the present disclosure, the ground insertion spraying structure 40 further includes a ground insertion control valve 43, the ground insertion control valve 43 is arranged on the ground insertion pipeline 42. The ground insertion control valve 43 can control the opening or closing of the ground insertion pipeline 42, so as to meet specific irrigation needs and achieve precise irrigation needs.

In one embodiment, one end of the ground insertion pipeline 42 is connected to the ground insertion control valve 43, and an opposite end of the ground insertion pipeline 42 is connected to the ground insertion spraying nozzle 41. The ground insertion control valve 43 is connected to the adapter 11 through the second clamping member 201. The ground insertion pipeline 42 and the ground insertion control valve 43 are a quick-release connection so that the ground insertion pipeline 42 and the ground insertion spraying nozzle 41 can be replaced or upgraded.

In one embodiment of the present disclosure, the planting system includes a garden bed and a watering system 100. The watering pipeline 10 is arranged around an inner wall of the garden bed.

The planting system in one embodiment of the present disclosure can spray water towards the interior of the garden bed through water outlets of the plurality of spraying members 20 to irrigate plants in the garden bed. Since water outlets of the plurality of spraying members 20 are capable of adjusting a water discharge direction relative to the garden bed, specific regions can be sprayed according to irrigation needs, achieving precise irrigation. Moreover, the plurality of spraying members 20 are spaced apart on the garden bed, which ensures uniform and comprehensive irrigation of the plants in the garden bed to realize comprehensive irrigation. In addition, since the watering pipeline 10 is arranged around an inner wall of the garden bed, the installation of the watering system 100 may be standardized and the influence of the watering pipeline 10 on aesthetics of plants, improving the aesthetics of the plants planted in the garden bed.

As shown in FIG. 1 and FIG. 2, in some embodiments, the garden bed is rectangular, the plurality of adapters 11 arranged on inner walls of two long sides of the garden bed are connected to the spraying members 20. More than one adapter located at each inner wall of the long side is evenly spaced, and a distance between the adapters 11 close to two short sides of the garden bed is the same as a distance between the two short sides, ensuring comprehensive and precise irrigation for the garden bed. In addition, one of a plurality of three-way members arranged on the two short sides of the garden bed is connected to an external water supply pipe, and other three-way members are connected to a plurality of ground insertion spraying structures 40 so as to enable the plurality of ground insertion spraying nozzles 41 to be evenly spaced along a length direction of the garden bed.

Figure 8:
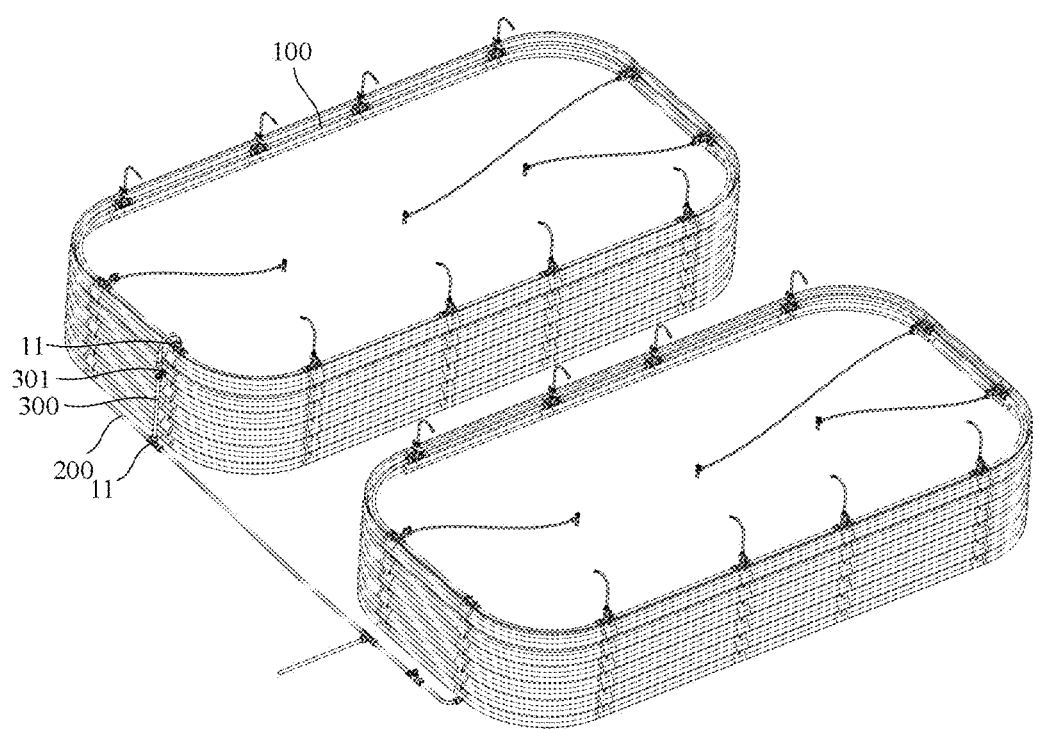
FIG. 8 is a schematic structural diagram of an irrigation system according to one embodiment of the present disclosure.

As shown in FIG. 8, one embodiment of the present disclosure also provides an irrigation system. The irrigation system includes a main pipeline 200, a plurality of branch pipelines 300, and a plurality of watering systems 100. The plurality of watering systems 100 correspond one-to-one with the plurality of branch pipelines 300, and each watering pipeline 10 is connected to the main pipeline 200 through the branch pipeline 300.

In the irrigation system of the embodiment of the present disclosure, a plurality of watering systems 100 can achieve comprehensive and precise irrigation for a plurality of planting devices 90.

As shown in FIG. 8, in one embodiment of the present disclosure, the irrigation system further includes a plurality of watering control valves 301, the plurality of watering control valves 301 correspond one-to-one with a plurality of branch pipelines 300. Each watering control valve 301 is arranged on the corresponding branch pipeline 300. The watering control valve 301 can be configured to control the opening or closing of the branch pipeline 300, so that a certain watering system 100 can be opened or closed according to specific irrigation needs, thereby irrigating the required planting device 90 and achieving precise irrigation needs.

In some embodiments, the branch pipeline 300 is also provided with an adapter 11, allowing additional branch pipes to connect to other irrigation systems 100. A watering control valve 301 is located between the adapter 11 on the branch pipeline 300 and the main pipeline 200, so that a plurality of watering systems 100 can be centrally controlled through the watering control valve 301, and then the required planting device 90 can be uniformly irrigated to achieve precise irrigation needs.

As shown in FIG. 8, in one embodiment of the present disclosure, the branch pipeline 300 is connected to the second connector 112 of one of the adapters 11 of the watering pipeline 10, and the branch pipeline 300 is rotatably connected to the second connector 112. A structure of the rotatable connection between the branch pipeline 300 and the second connector 112 can refer to a structure of the rotatable connection between the second connector 112 and the spraying member 20, and will not be repeated here. Thus, water can be supplied to the watering system 100 directly through the adapter 11 without the need for an additional water supply structure on the watering pipeline 10, making the assembly of the watering system 100 simple and standardized.

As shown in FIG. 1 and FIG. 8, in some embodiments, the second connector 112 of the watering pipeline 10 connected to the adapter 11 of the branch pipeline 300 is arranged upwards against the frame 901, so that the branch pipeline 300 can bypass the frame 901 from above and be connected to the watering system 100.

As shown in FIG. 2 and FIG. 8, in some embodiments, the second connector 112 of the watering pipeline 10 connected to the adapter 11 of the branch pipeline 300 is arranged downwards against the frame 901, so that the branch pipeline 300 can pass through the soil from a bottom of the planting device 90 and be connected to the watering system 100.

As shown in FIG. 8, in one embodiment of the present disclosure, the main pipeline 200 may also be provided with a plurality of adapters 11, the branch pipeline 300 is connected to the adapter 11 of the main pipeline 200, thus supplying water to each branch pipeline 300 through the main pipeline 200. For example, the branch pipeline 300 is connected to a second connector 112 of the adapter 11 of the main pipeline 200.

In some embodiments of the present disclosure, the main pipeline 200 is also provided with a timing device to open a water supply source at a specific time according to a set schedule for irrigation, thereby achieving automated irrigation needs.

Based on the above irrigation system, one embodiment of the present disclosure also provides an irrigation method, the irrigation method includes
  obtaining a moisture content of soil in the planting device 90;
  when the moisture content of the soil is less than a first preset moisture content, controlling a watering control valve 301 to open, so as to irrigate the corresponding planting device 90 through a watering system 100;
  when the moisture content of the soil is greater than a second preset moisture content, closing the irrigation control valve 301 to stop irrigation.

Through the irrigation method described above, a water-deficient planting device 90 can be irrigated in a timely manner to ensure the normal growth of plants.

In addition, the irrigation method further includes:
  obtaining moisture contents of a plurality of planting regions in the planting device 90;

when the moisture content of one of the planting regions is less than the first preset moisture content, controlling the watering control valve 301 to open, and controlling a spraying control valve 22 of the spraying member 20 corresponding to the planting region to open, or controlling a ground insertion control valve 43 of a corresponding ground insertion spraying structure 40 to open, to achieve localized irrigation of the planting region;

when the moisture content of the planting region is greater than the second preset moisture content, closing the irrigation control valve 301, the spraying control valve 22, or ground insertion control valve 43 to stop irrigation.

In this way, localized and precise irrigation of the planting device 90 can be achieved, saving water resources, reducing labor costs, and preventing excessive water accumulation in other planting regions.

In one embodiment of the present disclosure, the spraying control valve 22, the ground insertion control valve 43, and the watering control valve 301 may all be throttle valves, and users can actively open or close a passage to meet irrigation needs. Of course, the spraying control valve 22, the ground insertion control valve 43, and the watering control valve 301 may also be electric control valves so that a passage can be opened or closed through electronic control to achieve automated irrigation needs.

The above description is only a specific embodiment of the present disclosure, but the protection scope of the present disclosure is not limited thereto. Any equivalent structural transformations made under the concept of the present disclosure using the content of the description and drawings of the present disclosure, or directly/indirectly utilized in other related technical fields are all included in the protection scope of the present disclosure.

What is claimed is:

1. A watering system for a planting device with a frame, the frame being configured to accommodate planting media, the watering system comprising:
   a watering pipeline, the watering pipeline being mounted on the frame; and
   a plurality of spraying members, wherein the plurality of spraying members are located on the watering pipeline, the plurality of spraying members are spaced apart on the frame, water outlets of the plurality of spraying members face towards an interior of the frame, and the water outlets of the plurality of spraying members are capable of adjusting a water discharge direction relative to the frame to guide the water toward the interior of the frame for spraying;
   wherein the watering pipeline comprises a plurality of adapters and a plurality of connecting pipes, the plurality of adapters is configured to be mounted at intervals on a frame, two adjacent adapters are connected by a connecting pipe; each adapter comprises a base pipe;
   the watering system further comprises a plurality of fixing members, the plurality of fixing members are configured to fix to the frame, the plurality of fixing members correspond one-to-one with the plurality of adapters, the fixing member is provided with a rotating portion, the rotating portion is provided with a rotating hole, the base pipe is rotatably passed into the corresponding rotating hole along an extension direction of the base pipe;
   the base pipe is provided with an annular rotating groove, and the annular rotating groove is rotatably passed through the corresponding rotating hole: the rotating portion comprises two spaced apart elastically clamping arms, the two elastically clamping arms enclose to form the rotating hole, and the two elastically clamping arms are clamped on the annular rotating groove.

2. The watering system according to claim 1, wherein the watering pipeline is a closed-loop pipeline, and the watering pipeline is annularly arranged on the frame.

3. The watering system according to claim 1, wherein at least one adapter among the plurality of adapters is correspondingly connected to a spraying member;
   each adapter further comprises two first connectors, and at least one second connector, two ends of the base pipe are respectively provided with a first connector, and two first connectors are respectively connected to the connecting pipes located at two ends of the adapter, the second connector is connected to the base pipe, the second connector is located between the two first connectors and extends in a first direction, the second connector of at least part of the plurality of adapters is connected to the spraying member,
   wherein the first direction forms an angle with an extension direction of the base pipe.

4. The watering system according to claim 3, wherein the base pipe of each adapter extends along a circumferential direction of the frame, the base pipes of the plurality of adapters and the plurality of connecting pipes are annularly arranged on the frame.

5. The watering system according to claim 3, wherein the two first connectors are rotatably connected to the connecting pipes at two ends of the base pipe; or
   the second connector is rotatably connected to the spraying member.

6. The watering system according to claim 5, wherein two ends of the connecting pipes are provided with a first clamping member, and the first clamping member is rotatably embedded in the first connector.

7. The watering system according to claim 5, wherein one end of the spraying member is provided with a second clamping member, the second clamping member is rotatably embedded in the first connector.

8. The watering system according to claim 1, wherein a groove wall of the annular rotating groove is provided with a plurality of limiting protrusions spaced apart, an inner wall of the rotating hole is provided with a plurality of limiting teeth, at least one of the plurality of limiting protrusions is snapped into at least one of the plurality of limiting teeth.

9. The watering system according to claim 1, wherein each adapter is provided with two annular rotating grooves, and each fixing member is provided with two rotating portions, the two rotating portions correspond to the two annular rotating grooves respectively.

10. The watering system according to claim 1, wherein a side of at least one fixing member of the plurality of fixing members away from the adapter is provided with an arc-shaped groove, and the arc-shaped groove is configured to fit the frame.

11. The watering system according to claim 1, wherein the spraying member comprises a spraying pipe and a spraying control valve, the spraying control valve is arranged on the spraying pipe.

12. The watering system according to claim 11, wherein the spraying pipe comprises a malleable spraying pipe.

13. The watering system according to claim 3, wherein the second connector is detachably connected to the base pipe.

14. The watering system according to claim 1, wherein the watering pipeline is a non-closed pipeline.

15. The watering system according to claim 1, wherein the watering system further comprises at least one ground insertion spraying structure, the ground insertion spraying structure comprises a ground insertion spraying nozzle and a ground insertion pipeline, the ground insertion spraying nozzle is connected to the watering pipeline through the ground insertion pipeline.

16. A planting system, comprising:
- a garden bed and a watering system, the watering pipeline being arranged around an inner wall of the garden bed; a frame of the garden bed being configured to accommodate planting media; the watering system comprising:
- a watering pipeline, the watering pipeline being mounted on the frame; and
- a plurality of spraying members, wherein the plurality of spraying members are located on the watering pipeline, the plurality of spraying members are spaced apart on the frame, water outlets of the plurality of spraying members face towards an interior of the frame, and the water outlets of the plurality of spraying members are capable of adjusting a water discharge direction relative to the frame to guide the water toward the interior of the frame for spraying;
- wherein the watering pipeline comprises a plurality of adapters and a plurality of connecting pipes, the plurality of adapters is configured to be mounted at intervals on a frame, two adjacent adapters are connected by a connecting pipe; each adapter comprises a base pipe;
- the watering system further comprises a plurality of fixing members, the plurality of fixing members are configured to fix to the frame, the plurality of fixing members correspond one-to-one with the plurality of adapters, the fixing member is provided with a rotating portion, the rotating portion is provided with a rotating hole, the base pipe is rotatably passed into the corresponding rotating hole along an extension direction of the base pipe;
- the base pipe is provided with an annular rotating groove, and the annular rotating groove is rotatably passed through the corresponding rotating hole; the rotating portion comprises two spaced apart elastically clamping arms, the two elastically clamping arms enclose to form the rotating hole, and the two elastically clamping arms are clamped on the annular rotating groove.

17. An irrigation system, comprising:
- a main pipeline;
- a plurality of branch pipelines; and
- a plurality of watering systems, wherein the plurality of watering systems correspond one-to-one with the plurality of branch pipelines, and each watering pipeline is connected to the main pipeline through the branch pipeline;
- wherein the watering system is configured for a planting device with a frame, the frame is configured to accommodate planting media, the watering system comprises:
- a watering pipeline, the watering pipeline being mounted on the frame; and
- a plurality of spraying members, wherein the plurality of spraying members are located on the watering pipeline, the plurality of spraying members are spaced apart on the frame, water outlets of the plurality of spraying members face towards an interior of the frame, and the water outlets of the plurality of spraying members are capable of adjusting a water discharge direction relative to the frame to guide the water toward the interior of the frame for spraying;
- wherein the watering pipeline comprises a plurality of adapters and a plurality of connecting pipes, the plurality of adapters is configured to be mounted at intervals on a frame, two adjacent adapters are connected by a connecting pipe; each adapter comprises a base pipe;
- the watering system further comprises a plurality of fixing members, the plurality of fixing members are configured to fix to the frame, the plurality of fixing members correspond one-to-one with the plurality of adapters, the fixing member is provided with a rotating portion, the rotating portion is provided with a rotating hole, the base pipe is rotatably passed into the corresponding rotating hole along an extension direction of the base pipe;
- the base pipe is provided with an annular rotating groove, and the annular rotating groove is rotatably passed through the corresponding rotating hole; the rotating portion comprises two spaced apart elastically clamping arms, the two elastically clamping arms enclose to form the rotating hole, and the two elastically clamping arms are clamped on the annular rotating groove.

18. The irrigation system according to claim 17, wherein the irrigation system further comprises a plurality of watering control valves, the plurality of watering control valves correspond one-to-one with the plurality of branch pipelines, each watering control valve is arranged on the corresponding branch pipeline.

\* \* \* \* \*